United States Patent [19]

Jackson

[11] 4,189,062
[45] Feb. 19, 1980

[54] DISPENSING METHODS AND APPARATUS FOR SPLIT RETAINING RINGS

[75] Inventor: Sylvester Jackson, Long Island City, N.Y.

[73] Assignee: Waldes Kohinoor, Inc., Long Island City, N.Y.

[21] Appl. No.: 800,941

[22] Filed: May 26, 1977

[51] Int. Cl.$^2$ ............................................. B65G 59/06
[52] U.S. Cl. ................................. 221/188; 248/678; 221/282; 221/312 A
[58] Field of Search ............................ 227/114–118; 222/173; 206/493; 248/19, 346; 221/194, 220, 312 R, 312 A, 188, 189, 186, 274, 191, 284, 282; 211/49 D, 591

[56] References Cited

U.S. PATENT DOCUMENTS

| | | | |
|---|---|---|---|
| 1,102,297 | 7/1914 | Reid | 221/189 |
| 1,699,608 | 1/1929 | Cooke | 221/194 |
| 2,242,502 | 5/1941 | Bangs | 221/312 A |
| 2,712,398 | 7/1955 | Erdmann | 221/220 |
| 2,819,818 | 1/1958 | Erdmann | 221/312 A |
| 2,913,201 | 11/1959 | Blum Kin | 248/19 |
| 2,973,108 | 2/1961 | Gable | 221/312 A |
| 3,153,493 | 10/1964 | Westwood | 221/312 R |
| 3,559,845 | 2/1971 | Klein et al. | 221/274 |
| 3,578,177 | 5/1971 | Paden | 211/49 |
| 3,762,541 | 10/1973 | Hinden et al. | 221/312 A |

FOREIGN PATENT DOCUMENTS

821955  10/1959  United Kingdom ................ 221/312 A

*Primary Examiner*—H. Grant Skaggs
*Attorney, Agent, or Firm*—Burns, Doane, Swecker & Mathis

[57] ABSTRACT

A dispenser for split retaining rings includes a base, a bracket mounted on the base, a ring-retaining rail pivotably mounted to the bracket and a guide passage for a ring-removal tool. Lateral displacement of the rail is prevented by maintaining opposite sides of the rail in contact with stationary surfaces. The base is formed of a single piece of formed sheet metal and includes a bracket supporting platform and folded portions which prevent sagging of the platform. Frictional wear of the platform is prevented by a wear plate mounted thereatop. The ring-retaining portion of the rail is designed to accommodate a wide variety of retaining rings, including rings with and without a center prong. The dispenser is assembled at the time of manufacture with the rail permanently disposed with proper clearance above the guide passage.

13 Claims, 12 Drawing Figures

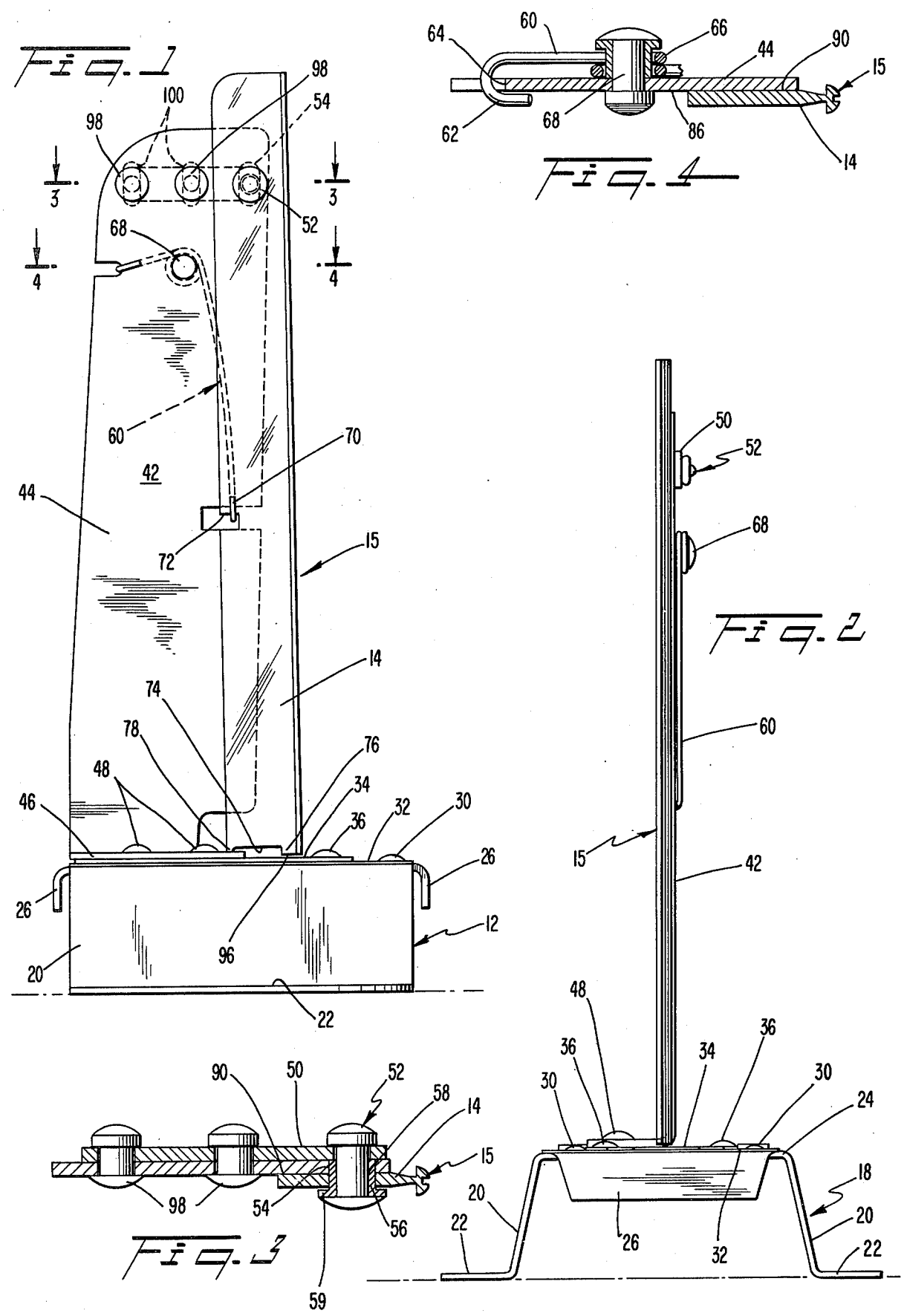

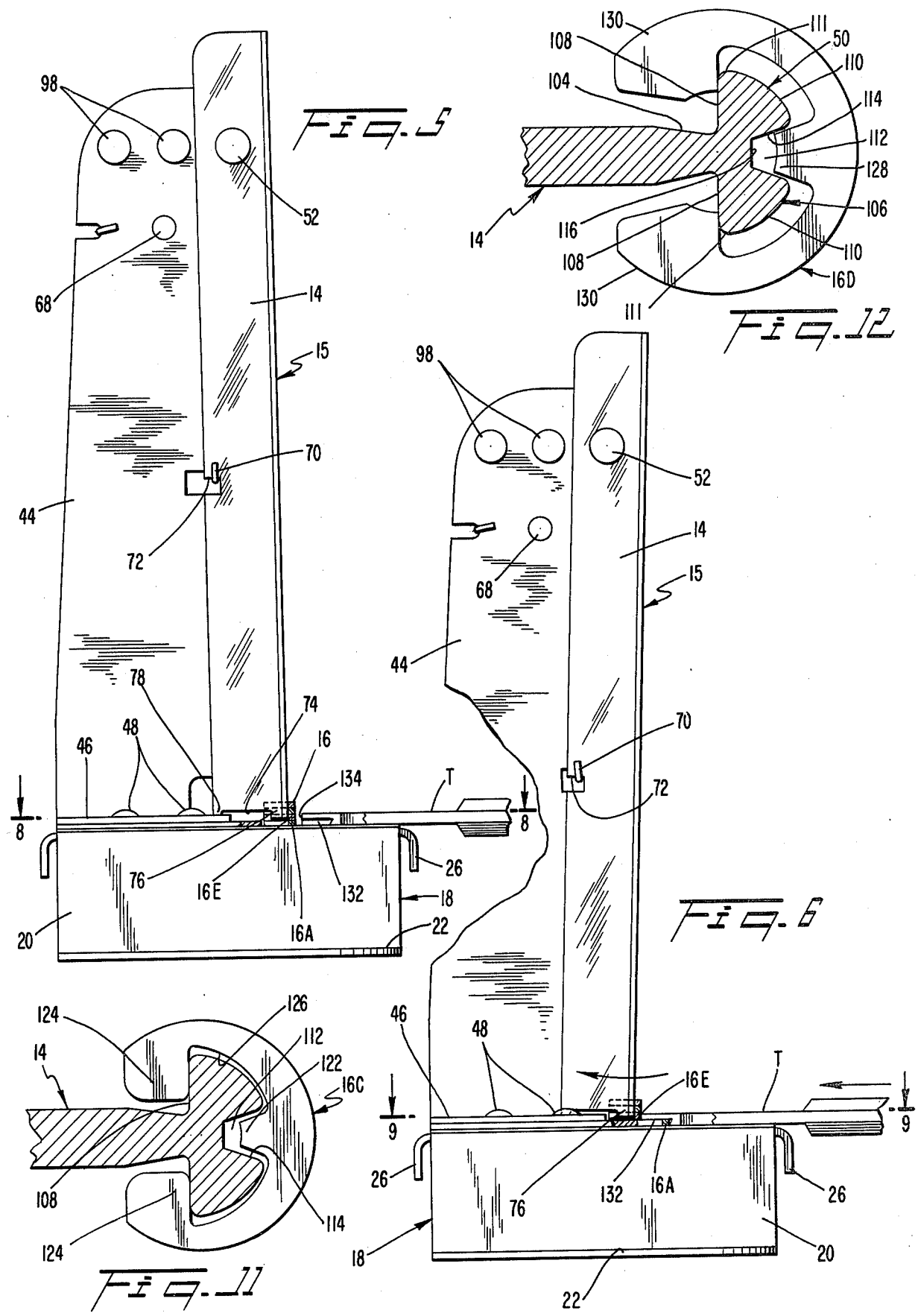

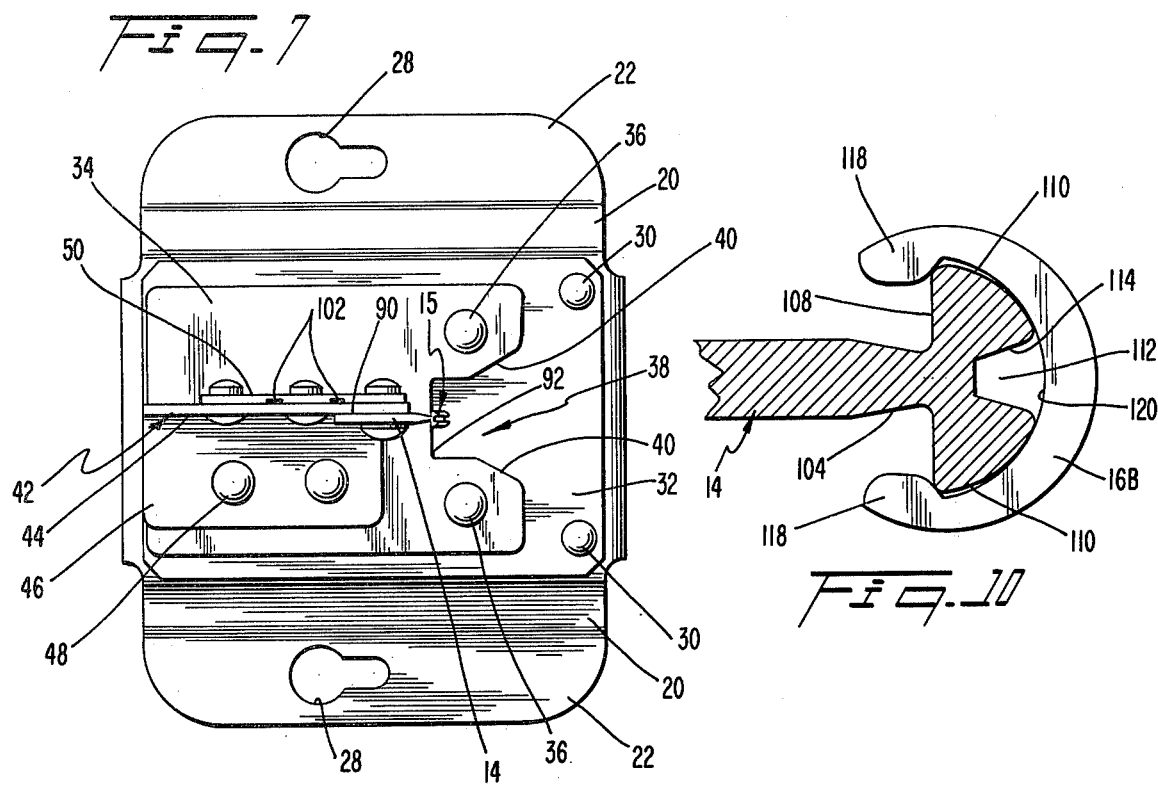
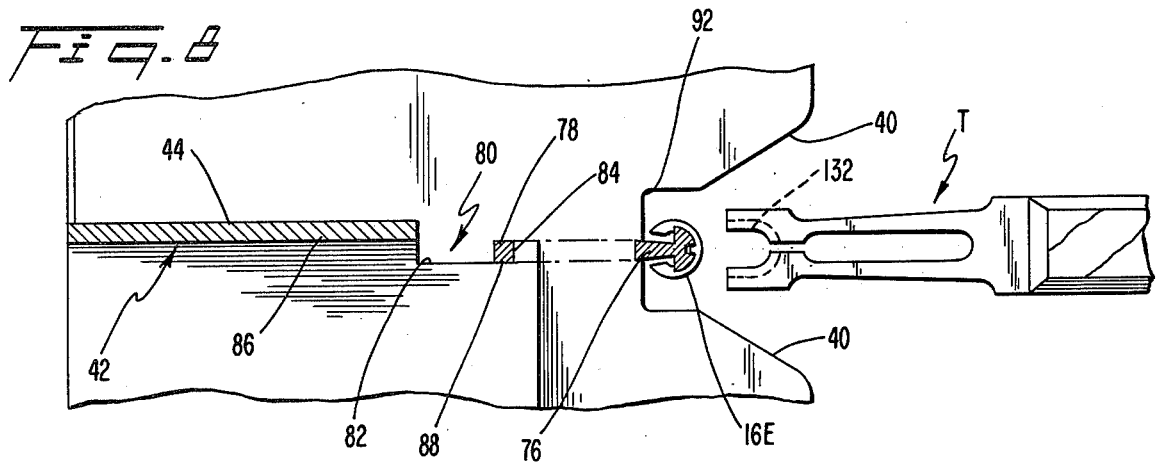
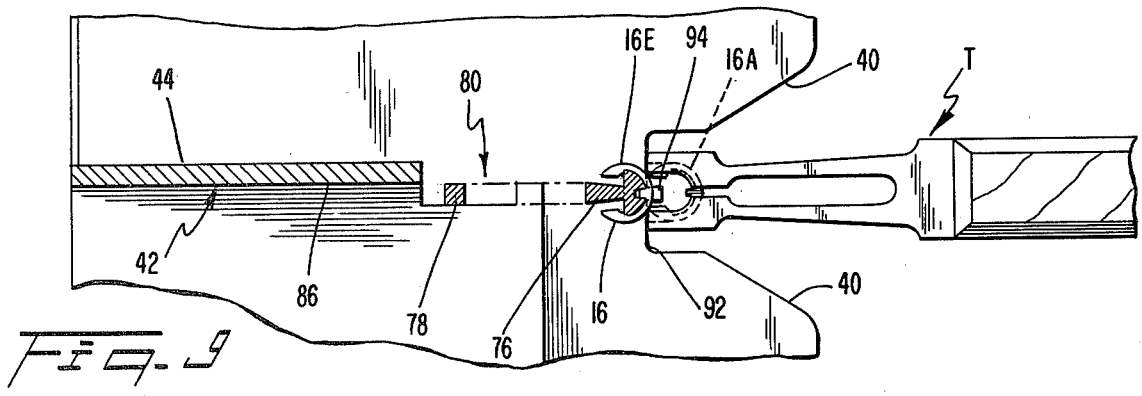

DISPENSING METHODS AND APPARATUS FOR SPLIT RETAINING RINGS

BACKGROUND OF THE INVENTION

This invention pertains to article dispensing and, more particularly, concerns the dispensing of split retaining rings.

Split retaining rings have been widely employed to provide an artificial shoulder on shafts or within housing bores capable of securing machine parts against axial displacement. Installation of such retaining rings is often performed during assembly-line operations, thereby requiring smooth and rapid handling of the rings. Accordingly, numerous proposals have heretofore been made to facilitate such handling, especially in the field of dispensers which retain a stack of the rings for convenient one-at-a-time removal. In general, a split ring dispenser includes an upright support rail upon which may be installed a stack of rings, and a guide slot which guides an applicator tool for engagement and withdrawal of the bottommost ring in the stack.

Applicator tools can be of various design, one common form comprising a handle and an expandable, curved groove capable of gripping the bottom ring in a stack of rings, while displacing the remaining rings out of contact with the bottom ring. The bottom ring can thereby be extracted from the dispenser and inserted into an assembly of parts, all by manipulation of the applicator.

Although split ring dispensers have, in the past, provided effective and valuable service, room for improvement remains. For example, some dispensers employ ring retaining rails in the form of leaf springs which are mounted by rivets so as to be yieldably displaceable when engaged by an applicator. These rivets are small to conform to the necessarily narrow configuration of the rails, and are subject to failure, especially when adhesive tape is pulled from a stack of rings following installation of the stack on the rail.

Other problems can result from the intensive usage to which the dispensers are subjected, mainly during assembly-line operations. For instance, rails which are not formed of hardened material wear too rapidly. On the other hand, rails with a narrow configuration have a tendency to warp and twist when hardened, thereby creating misalignment between the rail and the guide slot. Misalignment can also result from excessive play in the pivot connection of rotatably mounted rails, as the result of repeated usage.

Another area of concern involves the need for a relatively precise spacing of the lower end of the rail from the guide slot to assure that the applicator tool is able to grip the bottom-most ring as well as displace the remaining rings therefrom. In dispensers having adjustably mounted rails, it is not uncommon for the rail to slip, thereby requiring readjustment. If this should occur during assembly line operations, valuable time may be wasted. Of course, the rail can be permanently fixed in proper location at the time of manufacture, but there is little room for error in such an operation and elaborate procedures for minimizing error can be unduly expensive.

It would be desirable then, to effectively alleviate these and other problems with a view toward improving durability, performance and cost aspects of split ring dispensers.

As regards costs, an area of particular concern arises from the need to manufacture dispenser rails of different configurations to handle retaining rings of various shapes and sizes. By reducing the number of dispenser rail designs which are needed, manufacturing expenses can be kept down.

STATEMENT OF OBJECTS

It is, therefore, an object of the present invention to improve the performance and durability of split ring dispensers.

It is another object of the invention to minimize the occurrence of misalignment between a ring dispenser rail and an associated guide slot.

It is a further object of the invention to provide a split ring dispenser which is adapted to retain rings of a wide variety of shapes and sizes.

It is another object of the present invention to provide an accurate and simplistic technique for permanently locating the dispenser rail at the time of manufacture.

It is yet another object of the present invention to economically provide a strong and durable split ring dispenser which is resistant to bowing and other deformation.

BRIEF SUMMARY OF THE INVENTION

In accomplishing these objects, a split ring dispenser is provided which includes a base and a rail carried by the base for rotational movement and adapted to retain a stack of split rings for individual withdrawal by a tool. The tool rotatably displaces a lower end of the rail and grips the bottom-most ring. To prevent lateral displacement of the rail as the result of repeated use, warping, etc. there are provided first and second stationary surfaces which engage opposite sides of the rail as the rail travels in its path of rotational movement.

An independently significant aspect of the invention involves a rail for retaining a stack of split retaining rings. The rail includes a stem portion and a head portion at one end of the stem portion. The head portion comprises a pair of shoulders extending from opposite sides of the stem portion, and a pair of curved surfaces extending from outer ends of the shoulders in generally converging relation. These curved surfaces terminate short of one another to form an opening generally aligned with the stem portion. Lateral and rotational movements of the rings are resisted by contact of the rings with the stem shoulders and curved surfaces of the rail. The opening in the rail is operable to receive the center prong of E rings or reinforced E rings in a manner which may also prevent lateral and rotational ring movements.

Another independently significant aspect of the present invention involves a dispenser whose base comprises a single piece of formed sheet metal. The piece of metal is bent to form a flat platform, a pair of support legs on opposite sides of the platform, and a pair of aprons extending from front and rear ends of the platform. The support legs each comprise an upstanding portion and a laterally extending portion at the lower end thereof. The aprons are folded downwardly at substantially right angles relative to the platform. The aprons and the upstanding portions of the support legs are operable to resist sagging of the platform.

In an independently significant method aspect of the invention, misalignment of a rotatably mounted ring-retaining rail is prevented by continuously contacting opposite sides of the rail with stationary support surfaces as the rail travels in its rotary path, to prevent lateral displacement of the rail.

Another independently significant method aspect of the invention involves a method for assembling a split ring dispenser of the type which comprises a base, a bracket mounted on the base, and a ring retaining rail carried by the bracket. The bottom end of a ring retaining portion of the rail is to be spaced a predetermined distance above a guide passage. The rail is mounted to a backing plate by means of a fastener extending between the rail and backing plate through a vertically elongated slot in the bracket. A spacer is inserted between a lower end of the ring-retaining portion of the rail and the guide passage. The thickness of the spacer corresponds to the desired clearance. The rail is lowered relative to the bracket until the lower end of the ring retaining portion contacts the spacer. Thereupon, the backing plate is permanently joined to the bracket.

THE DRAWING

Other objects and advantages will become apparent from the following detailed description of a preferred embodiment of the invention in which like numerals designate like elements and in which:

FIG. 1 is a side elevational view of a dispenser for split retaining rings according to the present invention;

FIG. 2 is a front view of the dispenser;

FIG. 3 is a cross-sectional view taken along line 3—3 in FIG. 1 depicting the pivotal mounting of a ring-retaining rail of the dispenser;

FIG. 4 is a cross-sectional view taken along line 4—4 in FIG. 1 depicting the mounting of a return spring of the dispenser;

FIG. 5 is a side elevational view of a dispenser as an applicator tool is being advanced toward the bottom-most ring of a retained stack;

FIG. 6 is a view similar to FIG. 5 as the applicator tool grabs the bottom-most ring and pivotably displaces the rail rearwardly;

FIG. 7 is a plan view of the dispenser;

FIG. 8 is a fragmentary cross-sectional view taken along line 8—8 in FIG. 5, depicting in plan the approach of an applicator tool during a ring pick-off step;

FIG. 9 is a fragmentary cross-sectional view taken along line 9—9 in FIG. 6, depicting in plan the gripping of a retaining ring and displacement of the rail, by the removal tool;

FIG. 10 is a cross-sectional view taken through a ring-retaining portion of the rail, depicting one type of ring being retained;

FIG. 11 is a view similar to FIG. 10 depicting another type of ring being retained; and FIG. 12 is a view similar to FIG. 10 depicting yet another type of ring being retained.

DETAILED DESCRIPTION OF THE PREFERRED EMBODIMENT

A preferred embodiment of a split ring dispenser 10 according to the present invention includes a base 12 which rotatably carries a rail 14, the latter including a ring retaining portion 15 adapted to retain a plurality of split retaining rings 16 (FIGS. 5 and 6).

The base is fabricated of a single piece of thin, flexible sheet metal which is suitably bent at various locations to form a pair of support legs 18 having generally vertical and horizontal portions 20, 22, and a generally flat table or platform portion 24 joined at its sides to upper ends of the support legs (FIG. 2). The generally vertical portions 20 are slightly inclined for added stability. Extending integrally from font and rear ends of the platform portion 24 are aprongs 26 which are folded downwardly at right angles to the plane of the platform (FIG. 1). These folded aprongs 26 resist bowing or sagging of the platform about a fore-to-aft horizontal axis, while the upstanding portions 20 of the support legs 18 resist bowing or sagging out a side-to-side horizontal axis. Hence, the platform 24 lies substantially flat in a horizontal plane, despite the somewhat flexible nature of the metal.

The horizontal portions 22 of the support legs 18 each carry at least one keyed opening 28 for receiving a fastener for connection to a support (FIG. 7).

Mounted on the base platform 24 by means of fasteners 30 (FIG. 7) is a wear plate 32 formed of hardened metal. Disposed upon the wear plate is a shim or spacer plate 34 which is mounted to the base 12 by fasteners 36. This spacer plate includes a slot 38 having outwardly flared ends 40 (FIG 7). The slot 38 forms a guide passage for guiding an applicator tool T, as will be subsequently discussed.

Situated upon the spacer plate 34 is a bracket 42. This bracket 42 comprises a metal plate which is bent at right angles to form an upright portion 44 and a lower, laterally extending portion 46. The bracket 42 is secured to the base platform by means of fasteners 48 which extend through the bracket laterally extending portion 46, the spacer plate 34, and the wear plate 32.

The rail 14 is pivotably connected to the bracket upstanding portion 44 for rotation in a vertical plane. In this regard, the rail 14 is fixed to a backing plate 50 (FIG. 3) by a rivet type fastener 52 which extends through a vertically elongate slot 54 in the bracket upright portion (FIG. 1). The rivet 52, which forms the horizontal pivot axis of the rail 14, is situated within a bushing 56. The bushing 56 includes a shank portion 58 and a head portion 59 at one end of the shank portion. The other end of the shank portion 58 abuts against the backing plate 50.

The length of the shank portion 58 is slightly greater than the combined thickness of the bracket upstanding portion 44 and the rail 14 so that engagement between the head portion 59 and the opposing face of the rail is not so tight as to unduly impede free rotary motion of the rail 14.

A torsion spring 60 is connected between the bracket and the rail to bias the lower end of the rail forwardly (FIGS. 1 and 4). This spring 60 includes one end 62 hooked around a notch 64 in the bracket upstanding portion 44, a coiled portion 66 wrapped around a rivet 68 secured to the bracket upstanding portion, and another end 70 (FIG. 1) hooked around a notch 72 formed in the rail 14. The spring 60 is yieldable in response to engagement of the rail 14 by an oncoming applicator tool to allow the rail to be displaced, and thereafter returns the rail to a rest position (FIGS. 1, 5, and 8).

The lower end of the rail 14 includes a vertical cutout 74 (FIG. 1) which forms front and rear fingers 76 and 78 (FIG. 8). The rear finger 78 travels in a groove 80 formed in the lateral portion 46 of the bracket 42, the groove 80 including a pair of walls or vertical surfaces 82, 84. The vertical surface 82 extends in a fore-to-aft direction and is spaced in a horizontal direction from the vertical plane of the adjacent side surface 86 of the bracket upstanding portion 44 by a distance corresponding to the thickness of the rail (FIG. 8). Accordingly, one side wall portion 88 of the rail, formed by the face of the rear finger 78, continually engages the upstanding surface 82 during rotary movement of the rail 14, and an opposite side wall 90 of the rail continually engages the surface 86 of the bracket upstanding portion during such movement (FIG. 4). In this fashion, the bracket surfaces 82, 86 constitute vertically spaced, stationary constraining surfaces which maintain the rail 14 in its intended plane, in this case a vertical plane.

These stationary surfaces 82, 86 effectively resist the formation of any appreciable misalignment between the ring retaining portion 15 of the rail and the guide passage 38. That is, the rail 14 will be disposed in a vertical plane which bisects the guide passage 38, and lateral displacement of the rail from such an orientation will be resisted by the vertically and horizontally spaced stationary surfaces 82, 86 of the bracket.

The surface 84 of the groove extends laterally of the fore-to-aft surface 82 and into the path of travel of the rear finger 78. In this fashion, the lateral surface 84 forms a forward stop lip for the rail to prevent overtravel thereof in a forward direction.

The front finger 76 of the rail 14 constitutes a downward extension of the ring-retaining portion 15 of the rail. This front finger 76 travels forwardly of the stop surface 84 and is normally maintained in a rest position by the spring 60 (FIG. 8) wherein it overlies the floor of the guide passage, such floor being formed by the wear plate 32. Accordingly, the bottom-most retaining ring 16A in the stack of rings is able to drop onto the floor of the guide passage 38 in front of an inner edge 92 of the passage (FIG. 8). Lateral movement of this ring 16A is prevented by a lug 94 which extends forwardly from the inner wall and lies between the legs of the bottom-most ring 16A (FIG. 9).

The bottom end 96 of the front finger 76 is spaced above the floor of the guide passage 38 by a distance slightly greater than the thickness of a retaining ring 16. This clearance between the bottom end 96 of the front finger 76 and the floor of the guide passage 38 is set and permanently fixed at the time of manufacture of the dispenser 10. In this regard, a plurality of rivets 98 are secured to the backing plate 50 and extend through vertically elongated slots 100 in the bracket upright portion 44. These slots 100, as well as the elongated slot 54 of the pivot forming rivet 52, accommodate vertical adjustment of the rail 14 relative to the bracket 42. Accordingly, when a spacer or shim gauge having a thickness equal to the desired clearance of the front finger above the guide passage floor, is positioned beneath the front finger 76, the rail 14 can be lowered, as by being tapped from above by a hammer, to bring the front finger 76 into engagement with the shim. Thereafter, the backing plate 50 is permanently secured to the bracket, as by spot welding at 102 for example (FIG. 7), to fix the location of the rail relative to the guide passage. The provision of the rivets 98 in addition to the pivot forming rivet 52 aids in assuring that the backing plate will be displaced uniformly in a vertical direction.

The ring-retaining portion 15 of the rail 14 is configured to retain rings of different shapes and sizes. To this end the rail includes a tapered neck or stem 104 (FIGS. 10-12) and an enlarged head 106 at a forward end of the stem 104. The head 106 includes a pair of shoulders 108 extending at substantially right angles from a vertical plane bisecting the stem, and a pair of curved faces 110 extending from the outer ends of the shoulders 108. The transition corners juncture zones 111 where the curved surfaces 110 and the shoulders 108 meet are preferably rounded off.

The curved faces preferably have a common geometrical center of curvature at the intersection of a plane containing both shoulders and the plane bisecting the stem.

The curved surfaces 110 extend from the shoulders in converging directions, but terminate short of one another to form an opening 112 aligned with the stem 104, i.e. coplanar therewith. This opening or recess 112 includes inwardly converging side walls 114 and an end wall 116.

This configuration of the ring retaining portion 15 enables the rail 14 to effectively retain or confine rings of various shapes and sizes.

For example, a wide-gapped, radially assembled ring 16B (FIG. 10) of the type described in U.S. Feitl Pat. No. 2,491,306, can be mounted on the rail such that the inside surfaces of the outer ends 118 of the ring arms engage the corners 111 of the rail to limit rotational movement of the ring. Lateral movement of the ring 16B is resisted by the close proximity of the inside ring circle 120 and the curved surfaces 110 of the rail.

In FIG. 11, there is depicted a wide-gapped, radially assembled ring 16C of the reinforced E type mounted on the rail, with the center prong 122 of the ring disposed within the recess 112. Rotation of the ring 16C is resisted by engagement between the outer ends 124 of the ring arms and the rail 108 shoulders. Lateral movement of the ring 16C is resisted by the close proximity of the inside ring circle 126 with the rail curved surfaces 110, and by the limited clearance between the ring center prong 122 and the recess walls 114.

There is depicted in FIG. 12 a larger size E ring 16D of the wide-gapped, radially assembled type mounted on the rail. Rotational and lateral movements of the ring 16D are resisted by the close fit of the ring center prong 128 within the rail recess 112, and also by contact between the outer ends 130 of the ring arms with the rail shoulders 108.

The rings 16B,C,D, depicted in FIGS. 10-12 are merely exemplary of a wide variety of ring sizes and shapes for which the rail is suited.

ASSEMBLY AND OPERATION

Following the formation of the base 12, as by appropriately bending a flexible strip of metal, the dispenser is assembled by mounting the wear plate 32, spacer plate 34, and bracket 42 onto the base 12. The rail 14 is secured to the backing plate 50 by the rivet 52 which is passed through the elongated slot 54 in the bracket 42. The additional rivets 98 are also passed through elongated slots 100 and secured to the backing plate 50. A shim gauge (not shown) is inserted between the front finger 76 of the rail and the floor of the guide passage 38, and the rail 14 is then urged downwardly into engagement therewith. Movement of the rail in this fashion is permitted by the slidable arrangement of the rivets 52, 98 within the elongated slots 54, 100. With the rail 14 accurately positioned in this manner, the backing plate 50 is welded to the bracket at 102 to create a permanent connection therebetween and thereby permanently fix the clearance between the front finger 76 and the guide passage 38. The spring 60 is connected between the bracket 42 and the rail 14 to bias the ring-retaining portion 15 of the rail to a forward position overlying the guide passage 38 (FIG. 8). Proper positioning of the rail is assured by contact of the front finger with the stop surface 84.

To ready the dispenser for use, a stack of split retaining rings 16 is installed in the normal fashion over the top of the rail. For example, as noted earlier, the rings can be held in stacked form by adhesive tape which is attached along the outside length of the stack. Once the rings are installed over the rail, the tape is peeled from the stack. Damage to the rail or spring during this step is effectively resisted by the stop surface as well as the strong rail anchoring provided by the relatively large rivet 52.

Retaining rings 16 of different sizes and shapes are accommodated by the novel configuration of the ring retaining portion 15 of the rail including the tapered neck 104, the shoulders 108, the curved surfaces 110, and the recess 112 between the curved surfaces. Depending upon the shape of the ring being retained, rotation and lateral displacement of the ring can be resisted by engagement of the ends of the ring arms with the rail shoulders, the proximity of the rail curved surfaces and the ring inner circle, and/or by the proximity of a ring center prong with the rail recess walls.

To remove the bottom-most ring 16A from the dispenser, an applicator tool T (FIGS. 5, 6, 8 and 9) which can be of conventional design having an expandable curved groove 132 at its outer end, is advanced along the guide passage 38 formed by the slot in the spacer plate 34. As the applicator is advanced, an upper ungrooved portion 134 of the applicator (FIG. 5) contacts the next to bottom ring 16E of the stack and displaces it together with the remainder of the stack and the rail rearward causing the rail to pivot about the pivot axis of the rivet 52 against the bias of the spring 60. The bottom ring in the stack 16A is prevented from moving to the rear by wall 92 of the guide channel 38 and this bottom ring is grasped by the applicator. The pivoting action of rail 14 causes the next to bottom ring 16E to pass over the upper surface of the spacer plate 34 thus exposing the bottom ring 16A so that it can be grasped by the applicator. Upon withdrawal of the applicator T the rail 14 is returned to its rest position (FIG. 8) by the spring 60 and the next ring in the stack, having cleared the spacer plate 34, drops to the floor of the guide passage 38.

The present invention, then, considerably alleviates or solves many prior shortcomings of the ring dispenser art. Repeated actuation of the dispenser is unable to produce appreciable misalignment of the rail relative to the guide passage, due in large measure to the confining action of the stationary constraining surfaces. This enables the rail to be formed of hardened metal without risk of appreciable warping or twisting. Of course, the use of hardened metal minimizes frictional wearing not only of the ring retaining portion of the rail, but also of those areas of the rail which contact the stationary surfaces. Over-travel of the rail and overstressing of the spring during ring installation is effectively prevented by the stop surface.

The rail of the present invention is highly versatile since it is adapted to effectively retain rings of different sizes and shapes, thereby reducing the number of rail designs which must be manufactured.

The base of the dispenser can be inexpensively manufactured of formed sheet metal, and yet is very sturdy. The upstanding portions of the support legs, and the folded aprons, prevent bowing or sagging of the base platform, while the wear plate minimizes frictional wearing.

Manufacture of the dispenser with the rail permanently secured to the bracket in accurate orientation and clearance relative to the guide passage is provided by the novel method in which the rail is adjusted within elongate slots prior to being permanently joined to the bracket.

Although the invention has been described in connection with a preferred embodiment thereof, it will be appreciated by those skilled in the art that additions, modifications, substitutions and deletions are specifically described may be made witout departing from the spirit and scope of the invention as defined in the appended claims.

What is claimed is:

1. In a dispenser for split retaining rings comprising a base, a guide slot formed in the base, a rail carried by said base for rotational movement above said guide slot and adapted to retain a stack of split retaining rings for individual withdrawal by a ring removal tool which is insertable along said guide slot and rotatably displaces a lower end of the rail and grips the bottom-most retaining ring, the improvement comprising first and second vertically spaced stationary constraining surfaces carried by said base engaging opposite sides of said rail as the latter travels in its path of rotational movement, to prevent lateral displacement of said rail relative to said guide slot, said second surface disposed adjacent a bottom end of said rail.

2. A dispenser according to claim 1 including a bracket fixedly mounted to said base, said rail being pivotably mounted to said bracket, said first and second stationary surfaces being formed by portions of said bracket.

3. A dispenser according to claim 2 wherein said bracket includes an upright portion to which said rail is rotatably mounted and a laterally extending portion mounted to said base; said first stationary surface being defined by a side wall of said upright portion and said second stationary surface being defined by an upright edge of said laterally extending portion.

4. A dispenser according to claim 2 further including a spring for biasing the lower end of said rail forwardly; said rail including front and rear depending fingers; and said bracket including a stop lip extending into the path of travel of said front finger to limit forward travel of said rail, said rear finger traveling on one side of said stop lip in engagement with said second stationary surface and said front finger traveling on the other side of said stop lip and forming part of a ring-retaining portion of said rail.

5. A dispenser according to claim 1 wherein said base includes a shim plate mounted on said base, said shim plate having a slot which forms a guide passage for the ring removal tool.

6. A dispenser according to claim 1 wherein said rail comprises:
   a stem portion;
   a head portion at an end of said stem portion, said head portion comprising:
   a pair of shoulders extending outwardly from opposite sides of said stem portion, and
   a pair of curved surfaces extending from outer ends of said shoulders in generally converging directions and terminating short of one another to form an opening generally aligned with said stem portion.

7. A dispenser according to claim 1 including an upright member mounted on said base, said rail being rotatably mounted to said upright member and contacting a side wall thereof during rotational movement of said rail; a generally horizontal member mounted to said base and including an upright edge extending generally parallel to the direction of rotational movement of a lower end of said rail, said lower end of said rail contacting said upright edge during rotational movement of said rail; said side wall of said upright edge defining said first stationary surface, and said upright edge defining said second stationary surface.

8. In a dispenser for split retaining rings comprising a base, a guide slot formed in the base, a rail carried by said base for rotational movement above said guide slot and adapted to retain a stack of split retaining rings for individual withdrawal by a ring removal tool which is insertable along said guide slot and rotatably displaces a lower end of the rail and grips the bottom-most retaining ring, the improvement comprising first and second stationary constraining surfaces carried by said base engaging opposite sides of said rail as the latter travels in its path of rotational movement, to prevent lateral displacement of said rail relative to said guide slot, said base comprising a single piece of metal which is bent to form a flat platform, a pair of support legs on opposite sides of said platform, and a pair of aprons directly joined solely to said platform and extending from front and rear ends thereof; said support legs each comprising an upstanding portion and a laterally extending portion at the lower end of said upstanding portion, said aprons being folded downwardly at substantially right angles relative to the plane of said platform and terminating above the lowermost ends of said legs; said aprons and said upstanding portions of said legs resisting bowing of said platform.

9. A dispenser according to claim 8 and further comprising a wear plate secured atop said platform in underlying relation to said guide slot and being formed of a hardened metal.

10. A dispenser according to claim 9 and further comprising a shim plate disposed on said wear plate, said shim plate including a slot forming a guide passage for said tool.

11. In a dispenser for split retaining rings which comprises a base, and a ring-retaining rail mounted on said base, the improvement wherein said base comprises a single piece of metal which is bent to form a flat platform, a pair of support legs on opposite sides of said platform, and a pair of aprons directly joined solely to said platform and extending from front and rear ends thereof; said support legs each comprising an upstanding portion and a laterally extending portion at the lower end of said upstanding portion, said aprons being folded downwardly at substantially right angles relative to the platform and terminating above the lowermost ends of said legs; said aprons and said upstanding portions of said legs resisting sagging of said platform.

12. A dispenser according to claim 11 and further comprising a wear plate secured atop said platform and being formed of a hardened metal.

13. A dispenser according to claim 12 and further comprising a shim plate disposed on said wear plate, said shim plate including a slot forming a guide passage for receiving a ring-removal tool.

* * * * *